(12) United States Patent
Ourth

(10) Patent No.: US 6,902,785 B2
(45) Date of Patent: *Jun. 7, 2005

(54) LAMINAR STRUCTURE

(75) Inventor: Darren L. Ourth, Cameron, MO (US)

(73) Assignee: Denovus LLC, Moberly, MO (US)

( * ) Notice: Subject to any disclaimer, the term of this patent is extended or adjusted under 35 U.S.C. 154(b) by 75 days.

This patent is subject to a terminal disclaimer.

(21) Appl. No.: 10/644,698

(22) Filed: Aug. 20, 2003

(65) Prior Publication Data

US 2004/0157056 A1 Aug. 12, 2004

Related U.S. Application Data

(63) Continuation of application No. 09/173,632, filed on Oct. 16, 1998, now Pat. No. 6,638,590.
(60) Provisional application No. 60/062,843, filed on Oct. 17, 1997.

(51) Int. Cl.[7] .................................................. B32B 9/00
(52) U.S. Cl. .................... 428/40.1; 428/41.3; 428/41.8; 428/323; 428/325; 428/327; 428/328; 428/331; 428/351; 428/352; 428/354; 428/500; 428/515; 428/516; 428/517; 428/519
(58) Field of Search .............................. 428/40.1, 41.3, 428/41.8, 323, 325, 327, 328

(56) References Cited

U.S. PATENT DOCUMENTS

| | | | |
|---|---|---|---|
| 1,657,127 A | 1/1928 | Kibbey | |
| 1,996,400 A | 4/1935 | Bowen | |
| 1,996,401 A | 4/1935 | Bowen | |
| 2,139,422 A | 12/1938 | Schmittutz | |
| 2,710,996 A | 6/1955 | Pittman | |
| 3,250,050 A | 5/1966 | Finger et al. | |
| 3,319,328 A | 5/1967 | Finger et al. | |
| 3,319,332 A | 5/1967 | Finger et al. | |
| 3,352,581 A | 11/1967 | Robbins et al. | |
| 3,420,617 A | 1/1969 | Kimm | |
| 3,448,585 A | 6/1969 | Vogelsang | |
| 3,467,490 A | 9/1969 | Sommer | |
| 3,746,776 A | 7/1973 | Monahan et al. | |
| 3,953,661 A | 4/1976 | Gulley | |
| 4,161,090 A | 7/1979 | Watts, Jr. | |
| 4,245,931 A | 1/1981 | Watts, Jr. | |
| 4,312,162 A | 1/1982 | Medney | |
| 4,389,270 A | * 6/1983 | McClintock | ................ 156/218 |
| 4,799,340 A | 1/1989 | Lichau et al. | |
| 5,339,594 A | 8/1994 | Ventura-Berti | |
| 5,466,094 A | 11/1995 | Kirby et al. | |
| 5,553,438 A | 9/1996 | Hsu | |
| 5,662,974 A | * 9/1997 | Andrenacci et al. | ....... 428/36.9 |
| 5,763,036 A | 6/1998 | Terry et al. | |
| 5,932,646 A | 8/1999 | Roberts | |
| 6,006,479 A | 12/1999 | Fayle | |

* cited by examiner

Primary Examiner—Terrel Morris
Assistant Examiner—Arden B. Sperty
(74) Attorney, Agent, or Firm—Michael K. Boyer

(57) ABSTRACT

A laminar structure is disclosed that comprises a tacky mastic at least partially in contact with a ultra-violet (UV) light and moisture barrier. The structure can be employed for protecting a wide range of substrates such as wood, metal, concrete, cement, among other substrates. The structure can be cut or shaped into a virtually unlimited array of configurations. A release layer can be applied onto at least a portion of one or more sides of the structure. The release layer can be removed from the structure prior to applying the structure onto the substrate to be protected. Once applied the structure can protect the substrate from moisture, UV, microbial and animal attack.

14 Claims, No Drawings

LAMINAR STRUCTURE

This application is a continuation, of U.S. patent application Ser. No. 09/173,632, filed on Oct. 16, 1998 now U.S. Pat. No. 6,638,590, which claims the benefit of U.S. Provisional Patent Application Ser. No. 60/062,843, filed on Oct. 17, 1997. The disclosure of these patent applications is hereby incorporated by reference.

FIELD OF THE INVENTION

The subject matter of the instant invention relates to a composite structure that is useful for protecting an underlying substrate from the environment.

BACKGROUND OF THE INVENTION

A wrap or bandage has conventionally been employed for protecting wooden surfaces, e.g., the top of utility poles. Examples of such wraps are described in U.S. Pat. Nos. 3,420,617 and 3,467,490; the disclosure of each of which is hereby incorporated by reference. These wraps typically consist of a multi-layer structure including a layer of preservative containing material, a moisture barrier and a strength imparting layer. The disadvantages associated with such wraps are relatively high manufacturing cost, and the presence of materials having an undesirable environmental impact.

SUMMARY OF THE INVENTION

The instant invention solves problems associated with conventional materials by providing a laminar structure comprising a tacky mastic at least partially in contact with an ultra-violet (UV) light barrier. That is, the ultra-violet barrier is adhered to the tacky mastic, e.g, the mastic functions as an adhesive to adhere the UV barrier material to a substrate to be protected and the UV barrier material, inter alia, provides the underlying substrate with protection from ultra-violet radiation, water, among other agents that adversely impact the substrate. The structure can be employed for protecting a wide range of substrates such as wood, metal, concrete, cement, among other substrates.

The structure can be cut or shaped into a virtually unlimited array of configurations. A release layer or film (or liner) can be applied onto at least a portion of one or more sides of the structure, e.g, the release layer comprises a separate removable film. If desired, the release layer can be applied onto both sides or surfaces the structure, i.e., upon the tacky mastic and the UV barrier. The release layer is normally removed from the structure prior to applying the structure onto the substrate to be protected. Once applied the structure can protect the substrate from moisture, UV, microbial and animal attack.

DETAILED DESCRIPTION

The instant invention comprises or consist essentially of a laminar structure comprising a tacky mastic at least partially in contact with an ultra-violet (UV) light barrier. That is, the UV light barrier (or a film thereof) is sufficient to protect the mastic and substrate from degradation caused by UV exposure. The inventive structure can be substantially free from heavy metals such as chrome, lead, salts thereof, among other environmentally undesirable compounds. By substantially free, it is meant that neither the structure nor any layer or film thereof contains greater than about 2 wt. % of such compounds and normally about 0 wt. %.

The tacky mastic material can be based upon any suitable mastic type material such as about 5 to about 30 wt. % of at least one member selected from the group consisting of butyl rubber, butyl-styrene rubber, polyisobutylene rubber, commercially available elastomeric or rubber compounds, among other materials having a tacky characteristic with respect to the substrate and combinations thereof. The tacky material can also include about 15 to about 35 wt. % of one or more natural or synthetic oils such as polybutene, polyalphaolefin, among other materials effective at plasticizing the tacky material. One or more fillers such as about 40 to about 80 wt. % of at least one member selected from the group consisting of aluminum stearate, calcium carbonate, clay, carbon ash, silicon dioxide, titanium dioxide, among other compounds effective at extending the material and increasing viscosity, can be employed as a component of the material. One or more hydrocarbon resins such as about 1 to about 15 wt. % of an aliphatic, hydrocarbon resins, among others effective at adhering the material to the underlying substrate, e.g., Picotac® supplied by Hercules, can be a component of the tacky material. About 1 to about 5 wt. % of a commercially available anit-oxidants such as [methylene-3(3',5'-di-tert-butyl-4-hydroxyphenyl) propionate]methane and Thiodiethylene bis(3,5-di-tert-butyl-4-hydroxy)hydrocinnamate, among others, e.g, Irgonox® 1010 supplied by Ciba Giegy, can also be a component of the tacky material. The following is an example of a suitable mastic material:

| COMPONENT | AMOUNT WT. % | SUPPLIER |
| --- | --- | --- |
| butyl rubber | 2.87% | Exxon |
| calcium carbonate | 35.9% | Quincy Carbonates |
| hydrocarbon resins | 2.87% | Hercules |
| polybutene oil | 22.5% | Amoco |
| aluminum stearate | 0.35% | Mozel Medgel |
| methylene propionate methane | 0.02% | Ciba Giegy |
| carbon ash | 0.71% | Cabot Corporation |
| titanium dioxide | 2.87% | Chemcentral |
| butyl-styrene rubber | 9.57% | Exxon |
| silicon dioxide | 2.53% | PPG |
| clay | 19.7% | Evans Clay |

Normally, the amount of each component listed in the above Table can vary by about 2 to about 5 wt. %. The mastic material can also comprise one or more additives selected from the group consisting of viscosity control agents, colorants, microbial (fungus) inhibitors, water repellents, among others and combinations thereof. While any suitable antimicrobial material can be employed, particuaraly desirable results have been obtained by using a material comprising barium sulphate (such as that supplied by Busan as 11-M-1). If present, the additive comprises about 1 to about 3 wt. % of the compositions.

The UV barrier or film material can be any suitable material such as at least one member selected from the group consisting of low-density polyethylene, polyethylene/ ethylene vinyl acetate co-polymer, among others. Normally, the barrier comprises an opaque low-density polyethylene, i.e., opaque to UV radiation and in some cases opaque to visible light. While any suitable UV barrier material can be employed, suitable materials are currently supplied by Crown Zellerbach, Westlake Polyers Corporation and Elkay Plastics Co., Inc. The UV barrier protects an underlying mastic layer from exposure to the sun, improves moisture resistance, reduces microbial/animal attack of the underlying substrate, among other desirable properties. The UV barrier can be non-electrically conductive; especially when employed for protecting the top of an electric or utility pole, or other environments wherein electrical conduction is undesirable.

In the event, the inventive structure is employed in an application wherein UV resistance is not critical the barrier or film material can comprise at least one member selected from the group consisting of nylon, polyesters such as polyethyleneterupthilate (PET), PVC, PETG, polycarbonate, polystyrene, ABS, nylon, polyethylene, polypropylene, fluoropolymers, vinyls, styrenics, among other commercially available polymeric films. For example, moisture resistance is more important than UV resistance in subterranean applications.

The thickness of each component of the structure can be tailored to satisfy a particular end-use. Normally, the thickness of the mastic component is about ⅛ to about ¼ inch (about 125 to about 250 mils), and the UV barrier is normally less than about 5 mils (about 1 to about 10 mils). The thickness of each component and the structure itself should permit shaping the structure to conform to an underlying substrate.

An optional release layer or liner can be located on one or more sides of the structure. Normally, the release layer is applied onto the tacky mastic material such that once the release layer is removed the mastic adheres to the substrate. If employed, the release layer typically comprises a commercially available high-density polyethylene. Normally, a release agent such as silicone is applied onto the surface of the release layer that contacts the mastic material. Release layers having a release agent are commercially available such as those supplied by Douglas Hanson. The release layer can be of any suitable thickness which is normally about 3 to about 5 mils, e.g., about 4 mils.

The structure can be characterized by several physical and chemical properties. The structure normally has a dielectric strength in accordance with ASTM D-149 of greater than about 235 V/Mil. The Tensile Adhesive Strength as per the disk method (ASTM C 907-93) of the structure is at least about 17 psi. The material does not flow when tested in accordance with ASTM D 816-82. The consistency, in accordance with ASTM D 217-88, ranges from a minimum of about 4.5 mm to a maximum of about 15.0 mm at temperatures of 0 F and 120 F, respectively. The aforementioned values can, however, be tailored thereby permitting the structure to possess a wide range of characteristics.

The structure can be fabricated by using any suitable manufacturing apparatus and methods. Normally, the structure is manufactured by first preparing the mastic component of the structure by admixing the ingredients of the mastic. The mastic admixture can be introduced into an extruder having a heated die, e.g., heated to a temperature of about 130 to about 200 F The entire mastic handling apparatus can be heated for increased processability of the mastic. The heated mastic is extruded as a sheet upon a moving film or web of HDPE release film. While the mastic can be coextruded with the UV barrier, the UV barrier material is normally laminated onto the extruded mastic sheet (the UV barrier was formed as a separate and previously extruded film). The heat from the extruder increases the tackiness of the mastic thereby inducing the UV barrier material to attach to the mastic. For best results, the UV barrier/mastic surfaces being attached are substantially free of oil and/or water. The aforementioned release layer can be applied upon at least one side of the extruded tacky mastic material, e.g., a white high-density polyethylene release layer. Normally, the release layer is applied upon the UV barrier side as well as the mastic side of the extruded material.

Once fabricated the structure can be molded or shaped into a wide range of two or three dimensional configurations. In one aspect of the invention, the structure is shaped into a desired configuration by die stamping. For example, the structure is die cut by using a serrated cutting blade set into a Lexan® board. Any excess material resulting after shaping the structure may be recycled into the manufacturing process, e.g., by adding such excess material to the mastic admixture.

In one aspect, the inventive structure can be fabricated into shaped articles by employing a rotary die method. In this method, the mastic is extruded (as described above) as a sheet onto an HDPE release layer and substantially simulataneous with the extrusion a UV/moisture resistant layer, e.g., LDPE, is laminated onto the overhead surface of the mastic. The laminated mastic sheet is then passed through one or more rollers that compress the laminated mastic. If desired, the last roller is chilled or the laminated article is passed through a cooled region. The laminated mastic sheet is passed through a rotary die wherein the mastic is cut into a desired configuration. That is, as the mastic sheet passes under the rotary die (or cylinder) the die contacts the sheet and cuts through the mastic thereby defining the desired article. The flash or waste material is removed and, if necessary, the cut mastic sheet is trimmed to a predetermined length by a gillatine-type cutter.

The structure can be applied to and consequently affixed to a wide range of substrates. If present, the release layers are removed prior to affixing the structure to the substrate. Examples of such substrates comprise one or members from the group consisting of wood, metal, concrete, cement, among others. Normally, the substrate is relatively porous thereby allowing the mastic to penetrate into the substrate. The structure is particularly effective in protecting wooden structures such as utility and telephone poles, e.g., the inventive structure can be applied onto the top of the pole as well as wrapped around areas prone to rot/mildew. The structure can also be employed as a moisture barrier for concrete/cement surfaces such as the exterior surface of a residential foundation in the manner described in U.S. Pat. No. 5,763,036; hereby incorporated by reference. Moreover, the structure can be wrapped around the length of a metal article, e.g, wire rope, pipes and conduit; among other articles wherein moisture and/or UV resistance is desirable.

While the above Description places particular emphasis upon a laminar structure, the structure can include a plurality of films/layers. For example, if desired, an adhesive can be located between the mastic, UV barrier, release layer, among any other films/layers. The films or layers can be chemically similar or distinct from an adjoining film/layer. Further one or more of such films/layers can comprise a composite, e.g., a fiber reinforced material. If desired, the structure can be applied to a substrate that has been pretreated, e.g., with a colorant, flame or microbial retardant, among other conventional pretreatments. The inventive structure can also be treated by being exposed to a source of radiation, e.g., an electron beam, in order to impart rigidity to a portion of the structure.

The following Examples are provided to illustrate not limited the scope of the invention as defined in the appended claims.

EXAMPLES

Example 1

Compositiion/Mixing Method

The tacky material of the inventive structure was prepared in accordance with the following method. Two hundred pounds (200 lbs.) of butyl-styrene rubber (supplied by Exxon as L-100) was mixed in a double arm Baker-Perkins mixer with 60 lbs. butyl rubber (supplied by Exxon as 268 or Goldsmith and Eggleton as 301), 30 lbs. aliphatic hydrocarbon resin (supplied Hercules as Pictotac® B), 60 lbs. titanium dioxide (supplied by Chemcentral), 70 lbs. polybutene (supplied by Amoco as Indapol® H-300 or Exxon as Parapol® 1300) and 200 lbs. clay (supplied by Evans Clay as Snow Brite clay). This mixture was mixed for about 40 minutes and heated to a temperature of about 210 to 280 F.

Next, the following components were added to the mixer, admixed for about 10 minutes and heated to a temperature of about 210 to 270 F: 70 lbs of polybutene oil, 30 lbs. of hydrocarbon resin and 150 lbs. of clay. Then, the following was added to the mixer: 70 lbs. polybutene oil, 250 lbs. calcium carbonate (supplied by Quincy Carbonates as QW-325 or Morton Meyers as Q325), 25 lbs. silicon dioxide (supplied by PPG as Hi-Sil 233) and 62 lbs clay and heated to a temperature of about 210 to 255 F and mixed for about 10 minutes.

An additional 250 lbs of calcium carbonate, 70 lbs of polybutene oil and 28 lbs of silicon dioxide was added while mixing for about 10 minutes and heating to about 210 to 245 F. One-hundred fifty (150 lbs) of polybutene oil and 200 lbs of calcium carbonate were then added while heating to about 210 to 245 and mixing for about 10 minutes. Finally, 85 lbs polybutene oil, 50 lbs. calcium carbonate, 7.5 lbs. aluminum stearate, 0.5 lbs. phenyl propionate methane antioxidant (supplied by Mayzo as 1010) and 15 lbs. carbon ash (suppled by Cabot Corporation as Regal® 300 carbon black) were added to the mixer while heating to a temperature of about 210 to 245 F and mixing for about 10 minutes. This mixture was extruded in order to form the mastic component of the inventive laminar structure.

Example 2

Method for Extruding

The mixture prepared in accordance with Example 1 was extruded. The mixture was extruded by using a commercially available Bonnet extruder that was operated at a temperature of about 180 F and a speed of 32 RPM. The extruder was equipped with a heated barrel, hopper and die that released an extrudant about 3/16 inch thick by about 17½ inches wide. The mixture was extruded onto a 4 mil white HDPE coated release liner.

Example 3

Method for Forming Laminar Structure

After being extruded and while still heated from being extruded, the extrudant of Example 2 was laminated by being contacted from below with a black low density polyethylene (LDPE) film and from above with a white high density polyethylene film (HDPE). The LDPE becomes a UV barrier and the HDPE becomes a removable release layer. The laminated structure was then pressed between a mandrel in order to enhance adhesion among the components of the structure. The laminar structure was cut into a desired shape by using commercially available die cutting equipment. The laminar structure can be cut or shaped into a wide range of useful configurations.

What is claimed is:

1. A die cut structure for protecting wooden articles comprising at least one tacky mastic layer, and at least a portion of the mastic layer adhered to at least one UV and moisture resistant barrier film or layer wherein the barrier fun or layer is electrically non-conductive and the mastic layer is adhered to the wooden article.

2. The die cut structure of claim 1 wherein the mastic layer comprises at least one elastomer, the barrier film or layer comprises polyethylene and further comprising at least one removable release film or layer in contact with the mastic layer.

3. The structure of claim 1 wherein the mastic layer comprises butyl rubber, polybutene and at least one filler.

4. The structure of claim 3 wherein filler comprises at least one member from the group consisting of calcium carbonate, clay, aluminum stearate, silicon dioxide and titanium dioxide.

5. The structure of claim 1 wherein UV barrier film or layer comprises opaque low density polyethylene.

6. The structure of claim 2 wherein said release layer comprises high density polyethylene.

7. The structure of claim 1 wherein said structure has a dielectric strength of greater than 235 V/Mil.

8. The structure of claim 1 wherein said structure has a tensile adhesive strength of at least 17 psi.

9. The structure of claim 1 wherein said mastic layer comprises about 75 to about 90 wt. % of at least one additive.

10. The structure of claim 9 wherein said additive comprises at least one member selected from the group consisting of butyl rubber, butyl-stryrene rubber and polyisobutylene rubber.

11. An extruded and die-cut article comprising at least one mastic layer, at least on UV resistant film or layer at least partially in contact with and adhered to one side of said at least one mastic layer and a second film or layer at least partially in contact with a second side of said at least one mastic layer wherein said at least one mastic layer comprises a combination comprising butyl rubber, butyl styrene, polybutene, aliphatic hydrocarbon resin and calcium carbonate and said at least one UV resistant film comprises low density polyethylene having a dielectric strength of greater than 235 V/Mil when measured in accordance with ASTM D-149.

12. The article of claim 11 wherein said article is adhered to a substrate comprising wire rope.

13. An article comprising at least one mastic layer and at least one moisture resistant film or layer at least partially in contact with and adhered to one side of said at least one mastic layer wherein said at least one mastic layer comprises a combination comprising butyl rubber, polybutene, butyl-styrene rubber and calcium carbonate, and said at least one moisture resistant film comprises low density polyethylene and said mastic layer contacts a substrate comprising at least one member selected from the group consisting of metal and wood.

14. The article of claim 11 wherein the second film or layer is removable.

* * * * *